United States Patent [19]

Ebersole et al.

[11] Patent Number: 5,006,982

[45] Date of Patent: Apr. 9, 1991

[54] METHOD OF INCREASING THE BANDWIDTH OF A PACKET BUS BY REORDERING REPLY PACKETS

[75] Inventors: Ronald J. Ebersole, Beaverton; David Johnson, Portland; David Budde, Hillsboro; Mark S. Myers, Portland, all of Oreg.; Gerhard Bier, Herxheim, Fed. Rep. of Germany

[73] Assignees: Siemens Aktiengesellschaft, Berlin, Fed. Rep. of Germany; Intel Corporation, Santa Clara, Calif.

[21] Appl. No.: 261,047

[22] Filed: Oct. 21, 1988

[51] Int. Cl.$^5$ .............................................. G06F 13/36
[52] U.S. Cl. ................................. 364/200; 364/229.2; 364/230.1; 364/242.8; 364/242.92; 364/284.1; 364/284.3
[58] Field of Search ................................. 364/200, 900

[56] References Cited

U.S. PATENT DOCUMENTS

| | | | |
|---|---|---|---|
| 4,323,967 | 4/1982 | Peters et al. | 364/200 |
| 4,449,182 | 5/1984 | Rubinson et al. | 364/200 |
| 4,473,880 | 9/1984 | Budde et al. | 364/200 |
| 4,480,307 | 10/1984 | Budde et al. | 364/200 |
| 4,503,535 | 3/1985 | Budde et al. | 364/200 |
| 4,543,627 | 9/1985 | Schwab | 364/200 |
| 4,615,001 | 9/1986 | Hudgins, Jr. | 364/200 |
| 4,649,473 | 3/1987 | Hammer et al. | 364/200 |
| 4,654,654 | 3/1987 | Butler et al. | 340/825.5 |
| 4,858,116 | 8/1989 | Gillett, Jr. et al. | 364/200 |

Primary Examiner—Gareth D. Shaw
Assistant Examiner—Matthew C. Fagan
Attorney, Agent, or Firm—Volker R. Ulbrich; Owen L. Lamb

[57] ABSTRACT

A data processor bus in which information is transferred between agents attached to the bus by issuing request packets that request data from an agent on the bus and reply packets that return data requested by a request packet. A control method mixes request-and-reply packets on the bus by determining the use of a next-bus cycle using arbitration, reply deferral, and specification lines and the state of a grant queue and a pipe queue in accordance with a specified protocol. A request is forced to take the next available bus cycle upon the condition that there is an agent identified in the great queue and the pipeline queue is not full. A reply packet is forced to take the next available bus cycle upon the condition that the pipeline queue is full. A reply packet is forced to take the next available bus cycle upon the condition that the grant queue is empty and the pipeline queue is not empty. Giving requests precedence over replies to allows the pipeline to be kept as full as possible. A replying agent assigned to the highest priority slot 1 in the pipeline queue is allowed to defer its own slot in the pipeline queue until a later time to thereby permit a transaction in Slot 2 of the pipeline queue to be completed before the one ahead of it.

4 Claims, 7 Drawing Sheets

METHOD OF INCREASING THE BANDWIDTH OF A PACKET BUS BY REORDERING REPLY PACKETS

CROSS REFERENCE TO RELATED APPLICATION

U.S. patent application Ser. No. 07/257,857, filed on Oct. 14, 1988, entitled "Apparatus for Queuing Requests and Replies on a Pipelined Packet Bus", by M. Myers, et al. and assigned to Intel Corporation, the assignee of the present application.

1. Field of the Invention

This invention relates to electronic data processing systems and more particularly to the method and apparatus of an advanced processor bus system, communicating between and interconnecting with the major branches of the data processing system.

2. Background of the Invention

In the design of a data processing system, one of the first areas of design data allocation is the data communication capability. Since, except for very simple designs, every component cannot be directly connected to every other component with a full compliment of address and data lines, as even Very Large Scale Integrated (VLSI) circuits have pin out and drive limitations, the necessity of a system bus interconnecting the data processing system providing time division multiplexed sharing of the address and data portions of the bus between communicating components, becomes obvious. Once time division multiplexing of address and data information on a bus is required, so are control signals, timing signals, defined operations and protocols in order to operate the bus such that it uses the available data-bandwidth efficiently.

In order to achieve a high data bandwidth, a system bus usually is designed with numerous parallel lines so a unit of data referred to as a "word" can be transmitted at one time, and it is fashioned to transfer these "words" as quickly as feasible (i.e., it operates at high clock rates). To use the high data bandwidth effectively, control lines are included in parallel to the data lines, and a structure of bus sequences is defined so information can be communicated whenever possible and therefore the bus is never left waiting while there are available operations to be performed.

Another attribute of an effective bus system is that data scheduled to be transmitted over the bus system is provided the opportunity to reach its destination with a limited number of delays. The delay from the time the data is available to be transmitted on the bus, until the time it arrives at its destined address in clock cycles, is defined as the latency. Some latency is the inherent price paid for ordered communications at a high effective data bandwidth; however, the problems of data becoming invalid because of intervening updates while waiting for the bus at Input/Output connections, and at memory locations, require latency be minimized and defined always as a system operational limitation.

A further attribute of an effective bus system is that it must be flexible, that is, capable of communicating information to a variety of component configurations. It must be able to communicate to the bus interface unit of a processor, and the memory interface unit or units to form a single processor data processing system, and also capable of communicating to the bus interfaces of multiple general data processors, multiple memory interface units, and to the bus interface unit of input/output multiple processors to form multiprocessor, multibus systems. Flexibility comes by having a bus system that is modular and expandable, not only in hardware, but also modular and expandable in communication and data structure.

One example of a data processing bus system is shown in Budde et al, U.S. Pat. No. 4,480,307 of Oct. 30, 1984. Although a good bus system, it has a lower effective data bandwidth, primarily because it has only 16 data lines over which to send 32-bit data words and therefore takes at least two clock cycles per 32-bit word instead of one. Also, data going from a data processor unit to a memory control unit (MCU) has to go through a processor memory bus interface unit (BIU) where the communication is examined, the information format changed, and then switched onto a different format memory bus. This examination, change of format and switching time increases the latency of the data going between the general data processor and the interface memory controller. Moreover, the system bus provided for in the patent by Budde et al is somewhat inflexible. There is no mechanism to provide for data that takes a long time to access, such as information calculated by another processor, or stored in a slowly responsive memory. Data must be returned in the same order requested which requires either fast responses or responses will have to wait a long time in the FIFO response pipeline.

The above-referenced copending patent application Ser. No. 07/257,857 describes an apparatus and method for queueing requests and replies on a pipelined packet bus. A RAM buffers bus requests by storing packet information corresponding to each request to be sent over the bus in time slots allotted to each request. Three send slots keep track of the state of three send requests that are stored in the RAM. Three receive slots keep track of the state of three receive requests that are stored in the RAM. Nine send queue counters are stepped through a series of states to track an outgoing request and to track a corresponding incoming reply. Six receive queue counters are stepped through a series of states to track an incoming request and to track a corresponding reply. An output MUX connected to the send and receive queues generates status information as to the state of the slots. The status information as to the state of the send and receive slots is used to control the incrementing or decrementing of the send queue counters and the receive queue counters in accordance with a predetermined system bus protocol. The output MUX includes means for reordering relies by reordering the slots' depthcounter values. This copending patent application does not, however, disclose a bus sequencing method that defines how request and reply packets are interspersed on the bus.

It is therefore an object of the invention to provide a method of ordering replies to bus transactions in the circumstances under which a reply deferral mechanism may alter the normal sequence of replies.

SUMMARY OF THE INVENTION

Briefly, the above object is accomplished in accordance with the invention by providing a method of bus arbitration and bus sequencing. Information is transferred between agents attached to a bus by issuing request packets that request data from an agent on the bus and reply packets that return data requested by a request packet. Request and reply packets are mixed on the bus by determining the use of a next-bus cycle using arbitration lines from each agent on said bus, a reply deferral line, specification lines that specify that a bus transaction a request packet or a reply packet, and the state of a grant queue and a pipe queue. This is accomplished by placing agents requesting access to said bus in a grant queue in an order determined by the state of the arbitration lines. A pipeline queue of bus transactions in progress is maintained where the highest priority transaction is assigned slot 1 and the next highest priority transaction is assigned slot 2. A request packet is forced to take the next available bus cycle upon the condition that there is an agent identified in said grant queue and said pipeline queue is not full. A reply packet is forced to take the next available bus cycle upon the condition that said pipeline queue is full. Furthermore, a reply packet is forced to take the next available bus cycle upon the condition that said grant queue is empty and said pipeline queue is not empty. Reply packets are returned in the same sequence that bus transactions are ordered in said pipeline queue, unless a reply deferral line is asserted. Bus transactions in said pipeline queue are reordered upon the condition that said reply deferral line is asserted by the agent on said bus whose the bus transaction is assigned to said highest priority slot in said pipeline queue, to thereby defer its own slot in the pipeline queue until a later time. This permits a transaction in the next lower priority slot of said pipeline queue to gain access to said bus ahead of said agent on said bus whose bus transaction is assigned to said highest priority slot in said pipeline queue.

In accordance with an aspect of the invention the reply deferral line cannot be asserted by a replying agent that does not own the bus transaction in the highest priority slot of said pipeline queue.

In accordance with a further aspect of the invention the time out of a said bus transaction in said pipeline queue is stopped upon the condition that said reply deferral line is asserted by the agent on said bus whose the bus transaction is assigned to said highest priority slot in said pipeline queue and a bus-switching enable control bit is set in the agent. Furthermore, the reordering of said bus transactions in said pipeline queue is prevented.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

TABLE OF CONTENTS

A. AP-Bus Fundamentals
1. Introduction
2. Structure
3. Bus signals
B. Bus Transactions
C. Bus Transaction Protocol
1. Arbitration
2. Bus Sequencing
3. Reply Ordering
D. AP-Bus Details
1. Internal Implementation
2. AP-Bus Connector
E. Bus Topologies and Operation
1. Simple/Local Topology
2. Complex Topologies
A. AP-Bus Fundamentals
1. Introduction The AP Bus is a 32-bit, synchronous, bi-directional bus with multiplexed address and data. Any agent, being defined as any BXU or MCU on the AP Bus that meets the AP Bus specification, may communicate with another agent including memory via a bus transaction. A bus transaction consists of two communication packets, a Request packet sent by the node associated with the agent initiating the transaction and the Reply packet from the replying agent that completes it. A packet is a block of information that is logically connected and transmitted in sequence on the bus. Packets may be from one to five bus cycles in length and contain from one to sixteen bytes of data. Address information is always contained in the first cycle of any Request packet. Control information is included with each request or reply packet cycle. The address contains a memory address for a memory transaction or the memory-mapped address of another agent for an interprocessor transaction to the processor connected to the other agent on a local bus.

The AP Bus provides a high performance communication system for both single and multi-processor configurations with either single or multiple AP Bus topologies. The AP Bus system allows several Request Packets to concurrently wait for their respective replies. The mechanism that maintains the ordering of the replies and facilitates the completion of the transactions is referred to as the Pipeline Queue.

Requests are scheduled in a Grant Queue which holds the results of a sequential parallel polling process. In each step of the sequence, a group of bus agents will be polled if any want access to the bus. An arbitration mechanism provides quick resolution between conflicting requests.

The arbitration and control functions are distributed across the agents attached to the bus. There are no centralized arbitration or control components.

2. Structure

Figure 1:
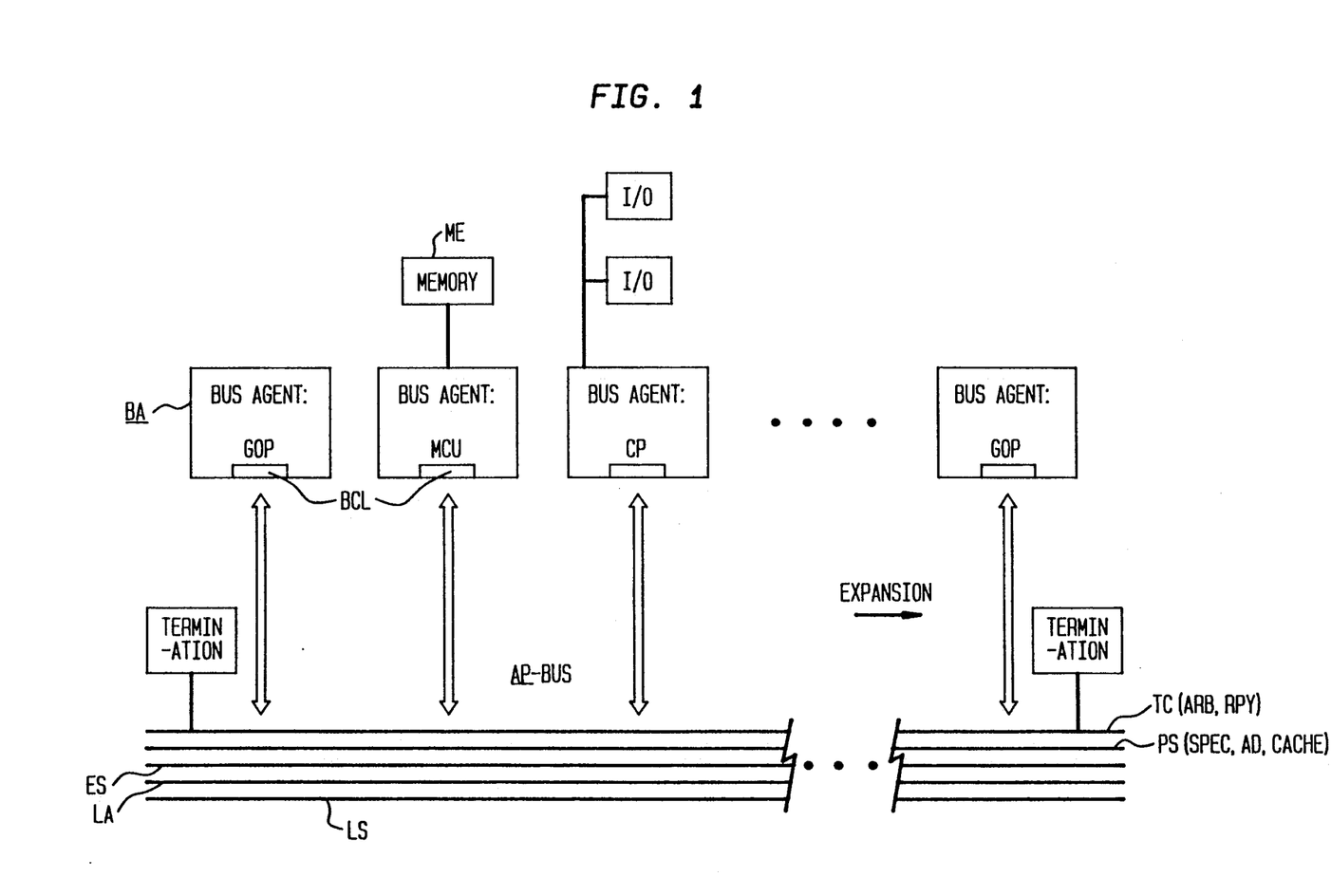
FIG. 1 shows a simplified partial block diagram of an AP Bus system among agents.

Several bus agents are shown with their respective attached branches to an AP Bus in FIG. 1. The GDP general data processor can communicate, via its respective Bus Expander Unit, with the memory array MA via a memory controller unit, MCU or a Bus Expander Unit or another processor via a BXU. The MCU or BXU provides the logic for interfacing both to the bus and to the memory MA. It will convert a bus transaction to an access or series of accesses to the memory array. The AP Bus system also provides the medium and protocol by which processors communicate between themselves. FIG. 1 illustrates how additional processors and memory arrays and their associated BXU or MCU may be added to the bus to expand its memory, processing power, or functionality. FIG. 1 also illustrates how complex single bus topologies can be connected through the use of bus expander units.

The AP Bus handles 47 bi-directional signals and 8 clock and control signals. All BXU's and MCU's attach to the 47 bi-directional bus lines. The 8 clock and control lines are either sourced to all agents or are local signals that are used for bus-related functions. The bi-directional bus signals are 'wire-OR'ed. This means that more than one MCU or BXU may assert a control or data signal at the same time. The signal will have the same value if one or more agents assert it. The asserted state is a low voltage level on the physical bus. The non-asserted or idle state will be high voltage.

Figure 2:
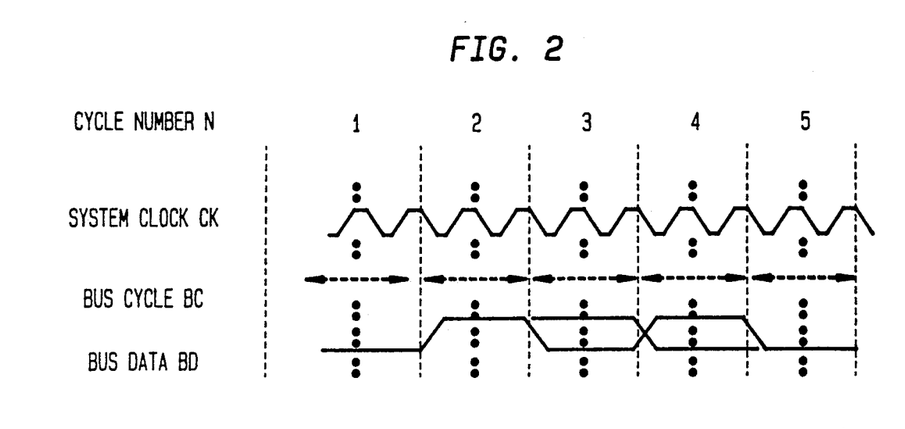
FIG. 2 shows a timing diagram of the overall AP bus operation.

3. AP-Bus Signals 3.1. Transaction Control Signal Group, TC (5 total) These signals as shown in FIGS. 1 and 2, consist of the arbitration signals and the Reply Ordering signals.

Figure 8:
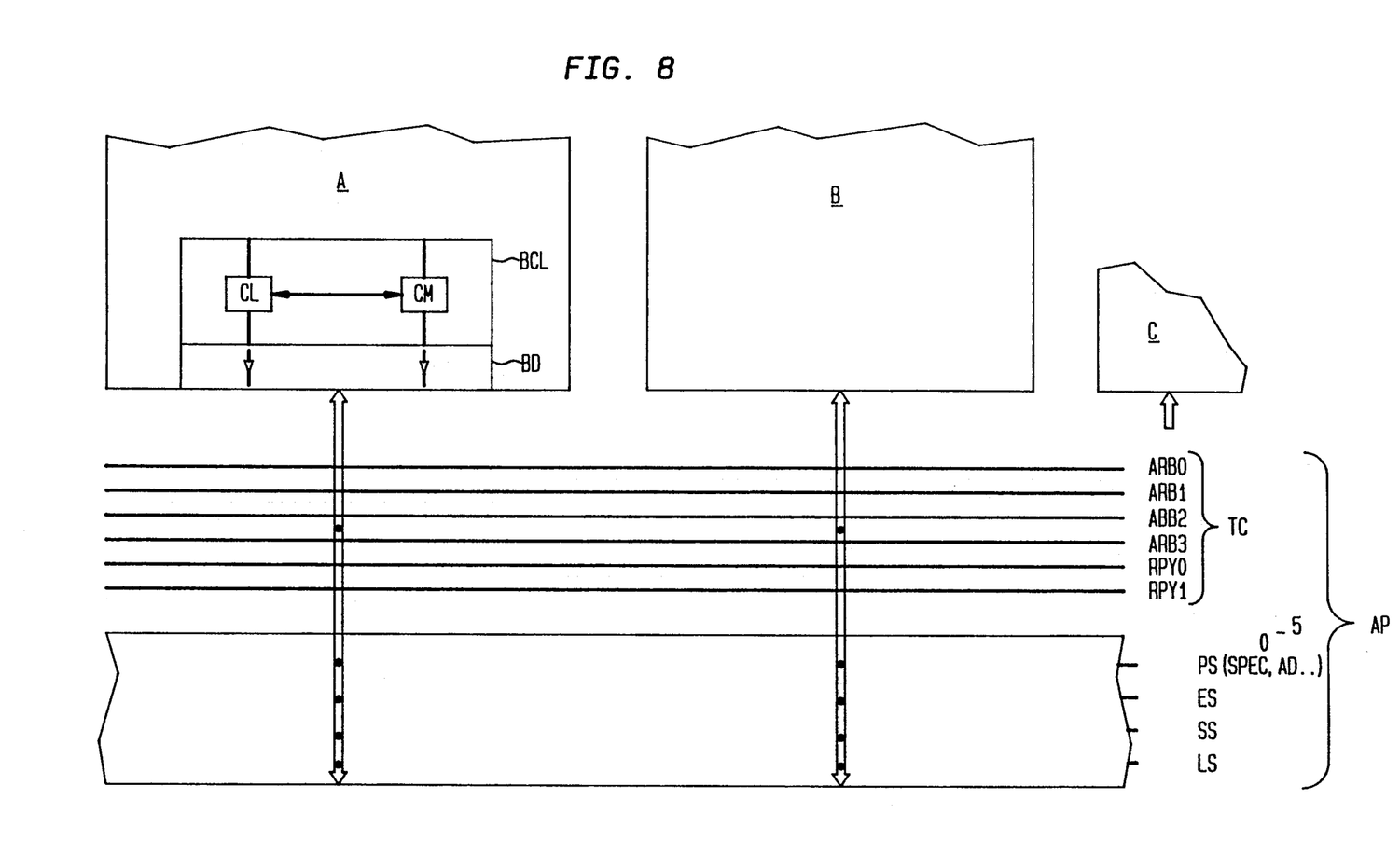
FIG. 8 is a timing diagram of agents A, B, and C attached to the AP bus and bus control logic (BCL) with agent A; and, FIG. 9 is a diagram of the control part (CL) within the bus control logic (BCL) of FIG. 8.

3.1.1. Arbitration: lines ARB (3..0) The ARB signals as shown in FIG. 8 are used by the bus agents to determine which agent has access to the bus next.

Figure 7:
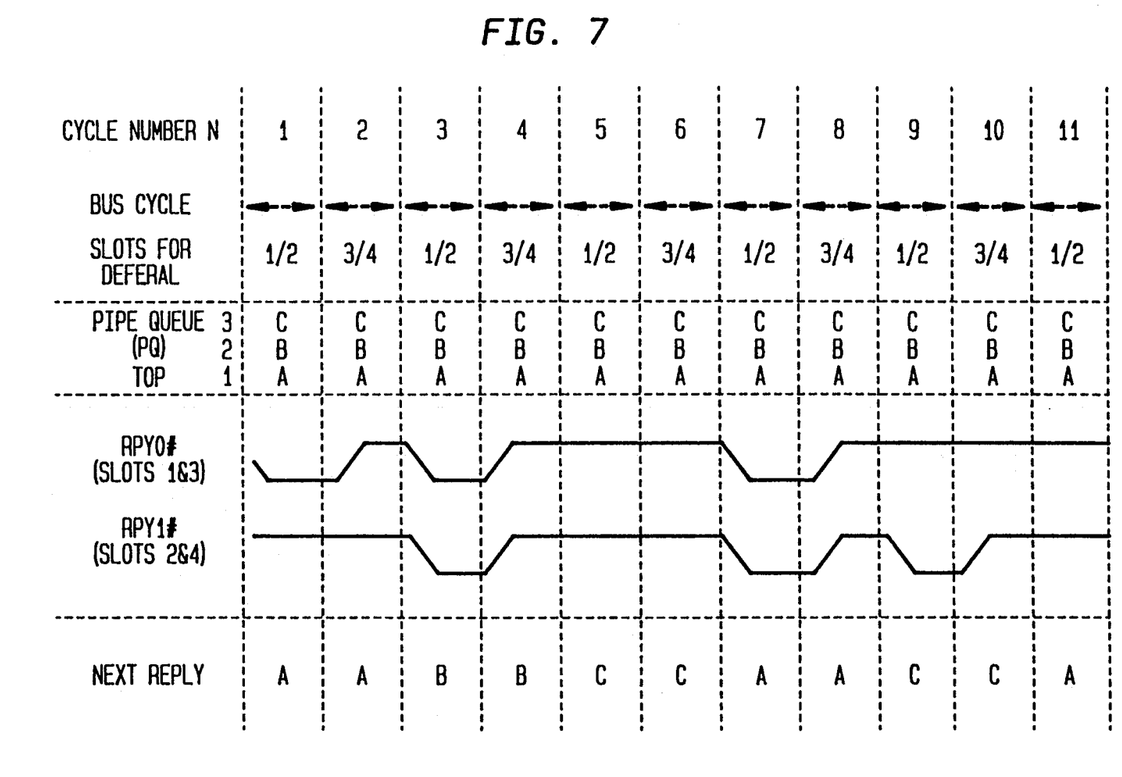
FIG. 7 shows a timing diagram of four agent (A, B, C, and D) ordering of reply packets.

3.1.2. Reply Ordering: lines RPY DEF0 and RPY DEF1 The Reply Defer signals allow an agent to give up its "time slot" on the bus if its access is going to take a long time. RPY DEF0 handles slots 1 and 3; RPY DEF1 handles slots 1 and 2, as shown in FIG. 7.

Figure 3:
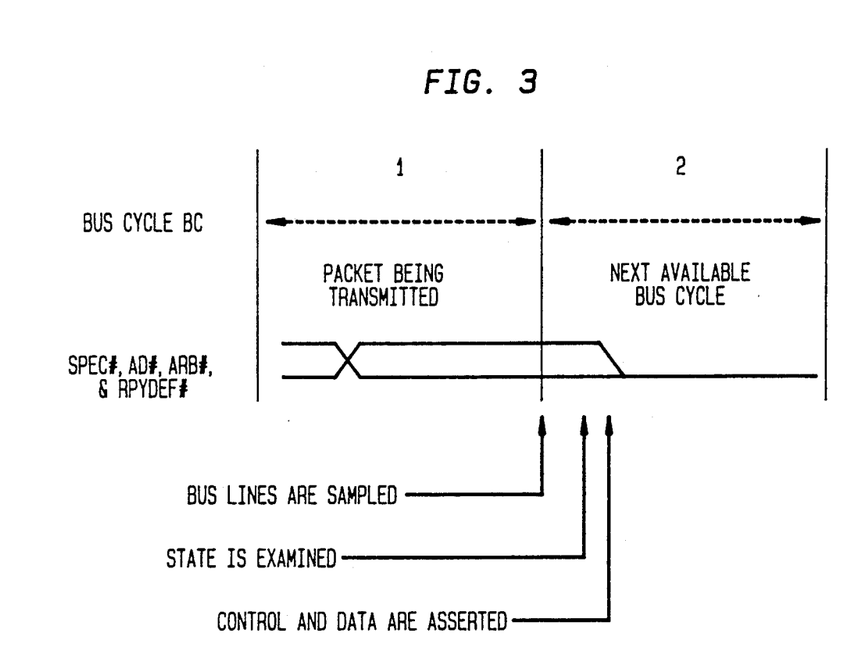
FIG. 3 shows a timing diagram of how the next available bus cycle is determined.
Figure 4:
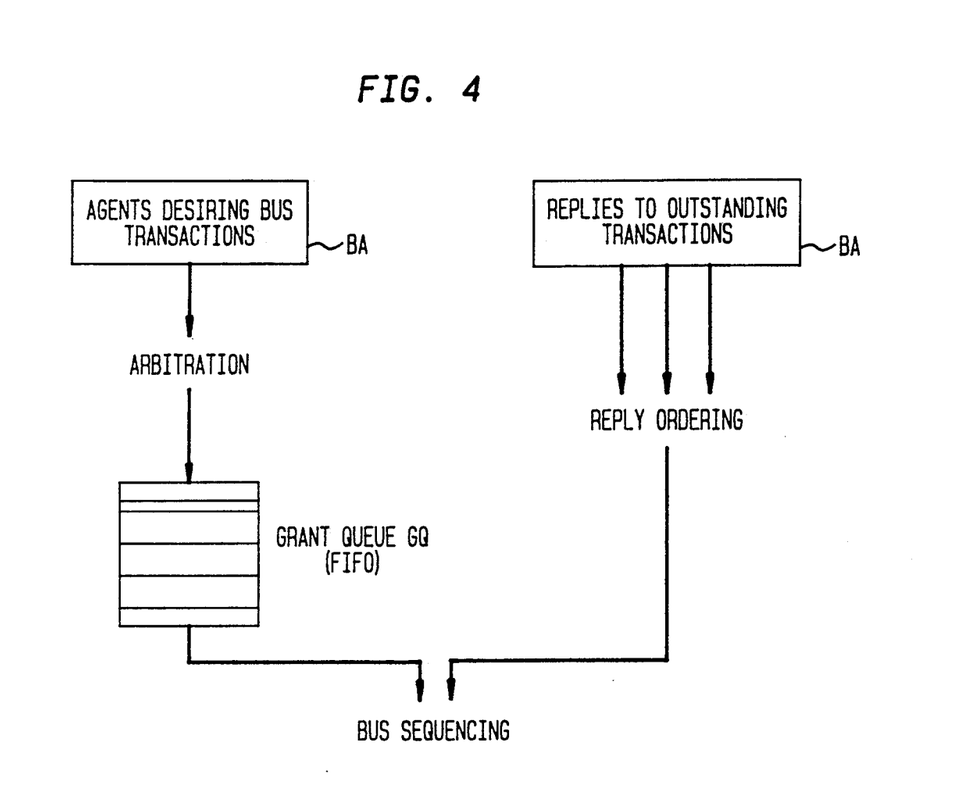
FIG. 4 shows in block diagram form the ordering of Request Packets and Reply Packets.

3.2. Packet Signals, PS (38 total) Packet Signals and signal lines as shown in FIGS. 2 and 3 are bi-directional and collectively form the actual packet. Address, data, and the type of transaction are transmitted on these lines.

3.2.1. Packet Specification: lines SPEC (5..0) The signals transmitted over the SPEC lines define the packet type, i.e., operation type, and the parameters required for the transaction.

3.2.2. Address/Data: lines AD (31..0) The AD lines transmit address and data information in a time progression during the transaction. The content of the AD lines is defined by the SPEC encoding during the same initial bus cycle.

3.3. Error Signal Group (lines ES) (4 total) These signals eiher provide redundancy to allow error detection and/or signal errors to other bus agents. They are part of a complete fault tolerant support package and represent the bus level portion of the support. They may be used independently of the higher levels of support.

3.3.1. Check Signal: CHK (1.0) Provide parity for SPEC lines and for AD lines signals.

3.3.2. Bus Error Signals: BERL (1.0) BERL is used to signal errors from bus operations or within BXU's/MCU's and associated circuitry.

3.4. Synchronization and Initialization Signal Group (lines LS) (3 total) These signals provide the ability to bring all bus agents to a consistent state and control the timing of bus signals. They are: SYSTEM CLOCK—2XCLK; INITIALIZATION Signal—INIT; and System Debug and Test—WAIT.

3.5. Local Agent Signal Group (lines LA) (5 total) The local agent signals have meaning only for a single agent but are commonly used signals. The system clock frequency, 2XCLK, is distributed to all Bus agents. This clock frequency will be divided in half to obtain the frequency at which the bus will transfer information. This clock period will be referred to as a bus cycle BC or just cycle throughout the description. The bus cycle provides the reference for all signals. Most bus signals will be driven in the beginning of the bus cycle and sampled at the end, the exceptions being the arbitration and the BERL signals which are driven midway from the beginning of a bus clock cycle. FIG. 3 illustrates the basic relationship between clocks and bus signals.

The SYSTEM CLOCK CLK shown in FIG. 2 is the clock distributed to all bus agents. The bus cycle is shown as two system clock periods in length and each one is given a cycle number N. The bus cycle will be shown in all timing diagrams while the system clock may be omitted for clarity. The falling edge is shown as coincident with the division line while the bus data BD is shown as slightly offset. This illustrates that the falling clock edge is used to sample the data at the end of the bus cycle. Bus data is shown as being driven after the falling edge of the clock.

FIG. 3 illustrates how the bus state is sampled and used to determine the next data to be driven on the bus. All agents keep track of what can happen next on the bus and then modify it by information from the cycle in progress.

3.6. The signal group provides the basis for the operation of the various bus agents in a system environment. This signal group supports the functions necessary for the power-up and initialization of an on-line replaced circuit board. The signal group provides communication to the additional system internal unit such as the power supply modules.

B. Bus Transactions

An agent attached to the AP Bus will communicate with AP Memory, MA or another agent by a transaction. The transaction communicates the operation to be performed, the location where it will be performed and the amount of data involved.

Transactions are separated into two independent parts, a Request Packet and a Reply Packet. A packet is a sequential group of cycles on the bus lines that form a logical unit. The SPEC and AD lines during each cycle of the packet will convey operation specification, address, or data information for the packet. Operation specification information is transferred on the SPEC lines, while address and data are transferred on the AD (address and data) lines. The packet is first categorized into the Request or Reply type. If it is a request, it is broken down into a basic action which defines whether data is being transferred to (Read) or from (Write) the initiating agent. The Reply will indicate the completion status of requested operation with either an accepted or refusal Reply.

A Request is further divided into specific operations of the two basic actions. The specific operations determine the amount of data to be transferred and special variants. The Replies are also divided into specific results. The specific result can indicate that the Request was accepted or rejected, and the amount of data that is included in the Reply Packet.

The location of a bus memory transaction is defined by a 32-bit memory address. Each address points at a single byte within a large 16-byte block. All transactions will perform an operation on a block or a portion of a block. Memory transactions can access only one block at a time. Advanced Processor Memory consists of elements that may be written to and read from using a specific set of operations. An agent can utilize AP Memory for both instruction and operand storage.

AP Memory is logically divided into 16-byte blocks. All accesses to memory over the AP Bus are made to a block. One to sixteen bytes of data may be read from or written to a block in any single transaction. Blocks are defined to begin on every 16-byte boundary beginning at address 0000 0000(hex). When the low-order four bits of an address are zero then the address points at the first byte in a block.

Each block is divided into bytes and words. A byte is eight bits long and is the minimum unit of memory that can be accessed by any transaction. All memory addresses point at a byte in memory. There are four bytes in a word and four words in a block. A memory address with the low order two bits equal to zero will point at the first byte (byte 0) in a word. The word is the basic unit of transfer on the Address/Data lines of the bus.

A transaction can access only a single block. Any agent desiring to access more than 16 bytes or data that crosses a block boundary must break those accesses into multiple transactions. In addition, the transaction to a block must explicitly access a contiguous string of data within the block. Access to the second and fourth bytes within a block cannot be done in one transaction as they are not contiguous.

The location of a bus memory-mapped transaction is likewise defined by a 32-bit memory-mapped address. Memory-mapping can use the accessed address space for other than memory operations. The initialization commands used to reset and parameterize bus agents are an example of this. These "commands" can only be written and will be completed differently than if the same transaction were directed at AP Memory. A memory-mapped space may use a smaller subset of the defined operations, implement a function other than memory, or complete the operation with a different Reply than AP Memory would. Both AP Memory and memory-mapped transactions will look like similar transactions when viewed on the bus, but will produce different actions for the same fundamental operations.

Inter-Agent Communication (IAC) is a specific set of memory-mapped addresses recognized by all agents, i.e., the BXU's and MCU's. IAC's provide a non-memory based, communication between bus agents and their attached processors or memory arrays. They are used for such system functions as initialization, access to error logs, and interrupt handling at the overall system level.

The 32-bit address field on the AP Bus provides a 4 Gigabyte address space. The top 12 Megabytes are reserved for IACs. The next 4 Megabytes are reserved for ICE memory. The remaining space is available for normal memory and memory mapped devices. AP Memory and IAC transactions will be defined more explicitly below.

A Request Packet will transfer data for the Write operation and the Reply Packet for the Read operation. Both packets will transfer up to 16 bytes of data on the AD lines, taking from 1 to 4 cycles in the packet depending on the amount of data. Two cycles is the implemented minimum number of cycles for a packet; if only one cycle is required for data transfer it is followed by a null cycle. The data is organized as words within the block and will be transferred as a word on the AD lines.

Each byte position in a memory word will always occupy the same position on the AD lines. Byte 0 in a word will be tranferred on AD0 thru AD7, byte 1 on AD8 thru AD15, and so forth. These positions on the AD lines will also be referred to as byte 0, byte 1, etc. Since data is not justified on the bus based on address, the requesting agent must reorder the data as required.

The SPEC field within a cycle is used to transfer the Tag Bit for both Reads and Writes. The Tag Bit will be the one associated with the word being transferred on the AD lines during the same cycle.

C. Read Data Transfer

The word is the basic unit of transfer on the bus for a Read transaction. A full bus cycle is required to transfer a word or part of the word. The requester must, therefore, formulate a Request for the words that include the desired string of data in the block. The address in the Request will determine the first word to be transferred. The initiating agent will receive the word(s) and extract the bytes desired, discarding those not needed.

D. Write Data Transfer

The Write Request is also word oriented in the transfer of data on the AD lines. Unlike reads, where data is not modified by the transaction, the Write Request must define the locations to be altered. The Write Request uses Byte Marks to define the specific bytes within a word that will be written. There is a Byte Mark for each byte of data on the AD lines transferred on the SPEC lines during the same cycle. When the Byte Mark is asserted, the byte on the AD lines will be written.

Write data will be transferred with the Write Request Packet. The first cycle will define the specific operation to be performed and transmit the address at which it will be performed. The Write data will follow the first cycle. The SPEC lines for each word will contain both the Tag Bit and the Byte Marks. The address will point at the first byte to be written in the block being accessed. A contiguous string of data will be written starting at that byte. Its length is defined by the number of cycles and the Byte Marks in each cycle.

E. IAC Transactions

The AP Bus defines a set of memory-mapped primitives to perform system initialization. These are called Inter-Agent Communication or IACs. The uppermost 12 megabytes of the AP Bus address space is dedicated to IACs and redefined to provide agent addressing and IAC parameters.

The memory-mapped address is broken down into IAC access type, bus destination and internal destination. The type field identifies which of the three agent addressing methods will be used. These spaces are for LOGICAL ID, PHYSICAL ID and presently unused space. The bus destination field contains the ID defined by the access type and will be used to address the intended agent. The LOGICAL and PHYSICAL IDs are used for normal system functions. PHYSICAL IDs are assigned at initialization time and provide a systemwide unique identifier for each agent. LOGICAL IDs are assigned to agents or groups of agents to implement and/or facilitate certain higher system functions such as fault tolerant agents and one of the group protocols.

The Internal Destination is used to define the action of the IAC and provide modifiers for that action. There are two types of action that are defined: the IAC message and Register/Command access is used to read or write internal registers in the agent or force an action such as initialization of an agent.

1. IAC Messages

IAC messages are from 1 to 4 words in length and are sent only by a Write Word(s) or Write Partial Word(s) where the Write Partial can specify only words. As before, a single cycle packet must be followed by a null cycle to allow the AP Bus system time to respond. The packet has a priority associated with it that is indicated in the Internal Destination Field. This is the packet priority and will be used to determine the acceptance or refusal of the message. Any Reply (other than a Read Reply) is a legitimate Reply.

Two bytes of the data field are fixed. They are called the Message-type field and the Message-priority field. Both are one byte in length and will be used by the higher level IAC protocols. The Message-priority and the packet priority are not required to be the same.

The priority field in the Internal Destination Field (packet priority) is 5 bits long and can range in value from 0 to 31. The packet priority is used by the addressed agent to determine if it will accept the message. A priority of 0 is the lowest and a priority of 31 is the highest. Priority 31 is considered a non-maskable interrupt (NMI) and must be accepted by the addressed agent.

2. Command/Register Access:

Command/Register accesses are Write Word(s) and Read Word(s) Requests. They may access only one register/command per transaction. The Register and Commands are typically one word long but there is no restriction. The Request must match the register/command size for the Request to be valid. All Replies are valid for Command and Register transactions.

F. Transaction Protocol

The separation of a bus transaction into a Request Packet and a Reply Packet provides for multiple transactions on the bus. Each packet occupies only the number of sequential bus cycles necessary to transmit the data it carries. There will typically be a delay between the Request and Reply which would normally be unused bus bandwidth. The AP Bus uses these cycles to pipeline multiple transactions on the bus.

The AP Bus utilizes a pipeline of requests, allowing several transactions to be in progress at any one time. Each transaction occupies one slot in the pipeline. As a Reply is made to a Request, the transaction is removed from its slot which is then available for another transaction.

Figure 6:
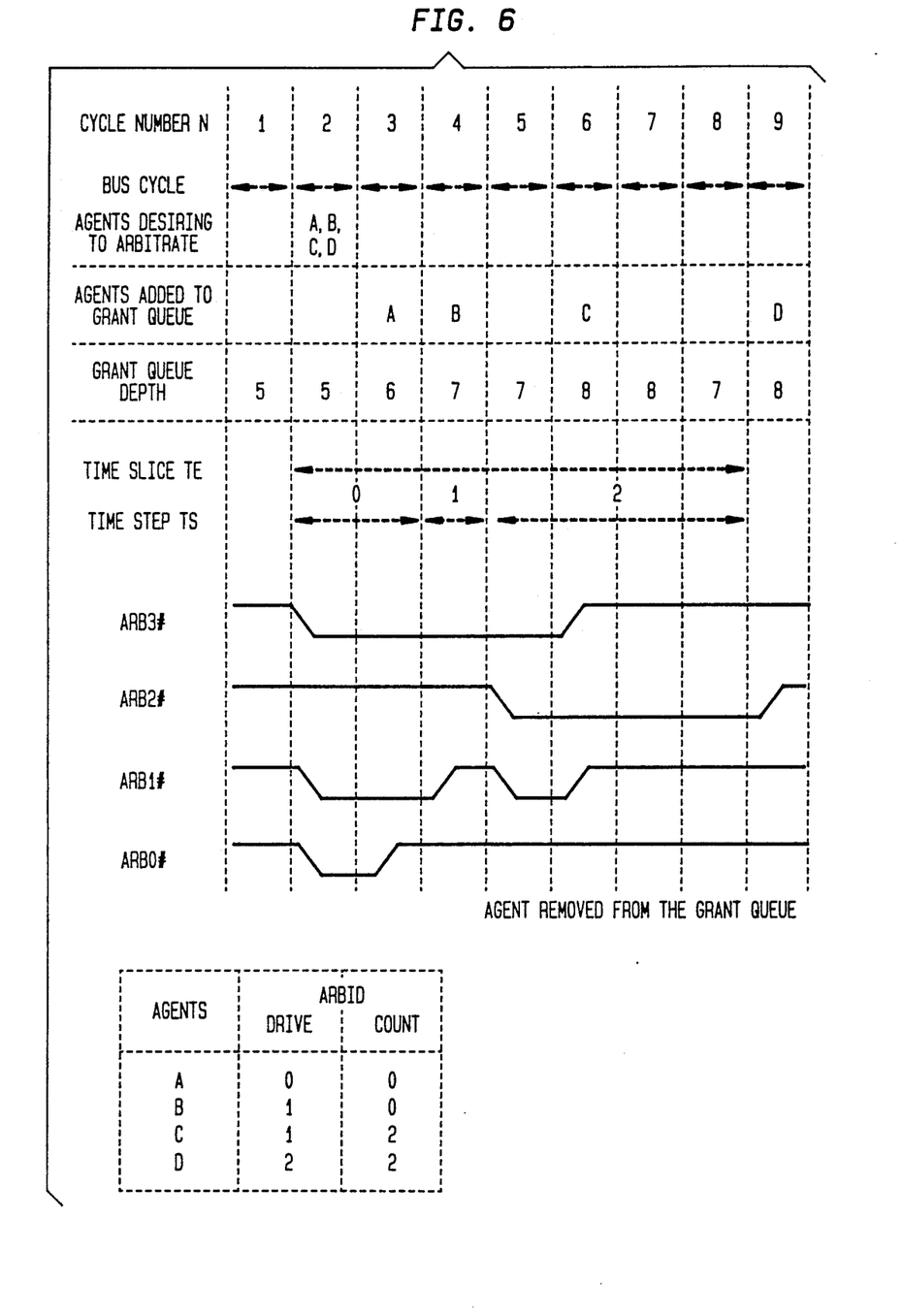
FIG. 6 shows a timing diagram of a four agent (A, B, C, and D) arbitration and access.

Multiple agents may request and use the bus in an ordered multiplexed fashion. They gain the use of the bus through arbitration. Arbitration orders and prioritizes (?) the agents' requests for the bus and places them in a Grant Queue. The agent at the top of the Grant Queue will take the next empty time slot of the AP Bus. FIG. 6 illustrates the relationship between arbitration, sequencing of Request and Reply Packets, and ordering of Replies.

1. Arbitration

The BXU's will arbitrate between themselves on behalf of their attached processors, to obtain access to the AP Bus. Memory Arrays do not initiate requests; therefore, MCU's don't arbitrate. The arbitration algorithm chosen for the AP Bus supports distribution of the implementation across the BXU's. The algorithm guarantees that no single BXU will be locked out from accessing the bus. Arbitration itself is based on a 6-bit arbitration identifier, or ARBID (number stored in a register) see FIGS. 5 and 6. Each BXU has its own unique ARBID that is used to determine its priority in each arbitration cycle or Time Slice. All BXU's arbitrating in a Time Slice will be placed in the Grant Queue, GQ. The top of the Grant queue GQ is the next agent to be placed on the bus. Note that BXU's acting as memory array controllers only do not make Requests and therefore do not arbitrate.

A Time Slice is a period of bus cycles in which grants are made for BXU's to access the bus. A Time Slice begins when the previous Time Slice has comleted and there are BXU's that desire to use the bus. All BXU's ready to arbitrate in the first cycle of a Time Slice will be included in that Time Slice. Any BXU that determines it needs the bus while a Time Slice is in progress must wait until the next Time Slice to arbitrate. The length of the Time Slice will be determined by the number of agents involved, the ARBIDs of the agents and the available depth of the Grant Queue GQ.

The four ARB (ARB3 ... 0) lines are used in implementing the arbitration algorithm. They are wire-or signals driven by all active agents and monitored by all agents. They will be used to signal the beginning of a Time Slice and determine the next BXU to be placed in the Grant Queue. Each Time Slice will have from 1 to 32 Time Steps. Within each Time Step up to three grants can be made.

Figure 5:
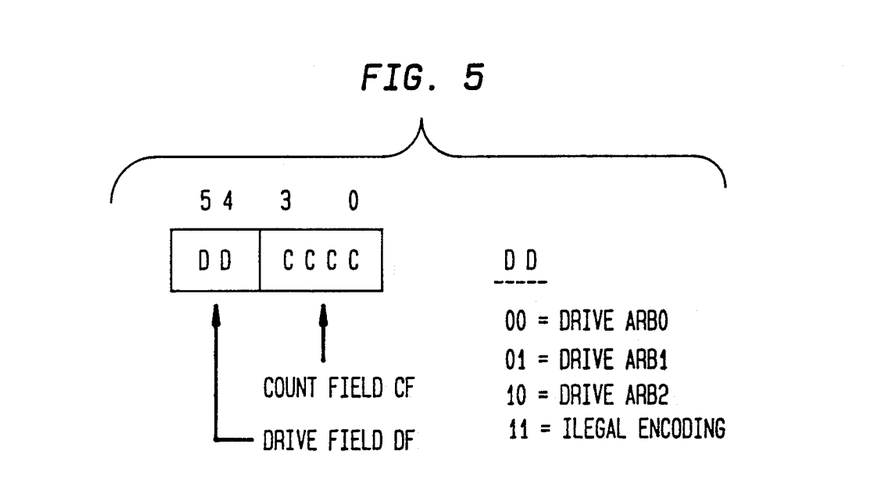
FIG. 5 shows the two fields that make up the ARBID code.

The ARBID, Arbitration Identification Number, as shown in FIG. 6, has two fields that determine the grant order. The COUNT FIELD CF determines the number of Time Steps required by the agent before its Time Step. The DRIVE FIELD DF determines the agent's priority within the Time Steps TS. FIG. 5 further illustrates the relationship of the DRIVE FIELD to the ARB lines.

The COUNT FIELD CF in an ARBID is from 0 to 31 in value. A COUNT FIELD CF of 0 indicates that the BXU will arbitrate in the first Time Step of a Time Slice while a value of 31 indicates that it will arbitrate in the thirty-second Time Step. The DRIVE FIELD DF is used for parallel arbitration within a Time Step. Agents having the same COUNT value in their ARBID will arbitrate in the same Time Step. The DRIVE FIELD DF encoding determines which of the three parallel arbitration lines, ARB0 through ARB2, the agent will assert during this Time Step. The agent asserting ARB0 will be placed in the Grant Queue GQ (FIG. 9) first, followed by the one asserting ARB1. Then the one asserting ARB2.

ARB3 is a logical "OR" signal between the BXU's and when asserted by one or more units pulling the voltage on the line to a low voltage, will indicate if there are any more Time Steps required to complete the Time Slice. ARB3 will be asserted by all agents in the Time Slice that require additional Time Steps. The COUNT FIELD in an agent's ARBID determines how many Time Steps the agent will drive ARB3 and where it will assert its parallel arbitration line. For example, if an agent's COUNT FIELD is 3, then it will assert ARB3 for three Time Steps and then assert its parallel arbitration line of the fourth Time Step. This can be determined by counting back the count field number to zero. The Time Slice will be complete if there is no other agent asserting ARB3 in that fourth Time Step.

A Time Step's duration is determined by the number of parallel arbitration lines asserted during the first bus cycle of the Time Step and the available depth of the Grant Queue GQ. Each agent asserting one of the three parallel arbitration lines will be placed sequentially into the Grant Queue. If all three lines are asserted, then the agent asserting ARB0 will be placed in the Grant Queue during the first cycle of the Time Step. The agent asserting ARB1 will be assigned on the second cycle and the one asserting ARB2 on the third. The Time Step is complete when all the agents arbitrating in parallel are assigned to the Grant Queue. If only two lines are asserted, the agent asserting the higher priority will be placed in the Grant Queue during the first cycle of the Time Step and if the Grant Queue is still not full, the remaining agent asserting an arbitration line will be placed in the Grant Queue on the subsequent Time Step. If only one line is asserted, the agent asserting that line is placed in the Grant Queue on the first Time Step.

Figure 9:
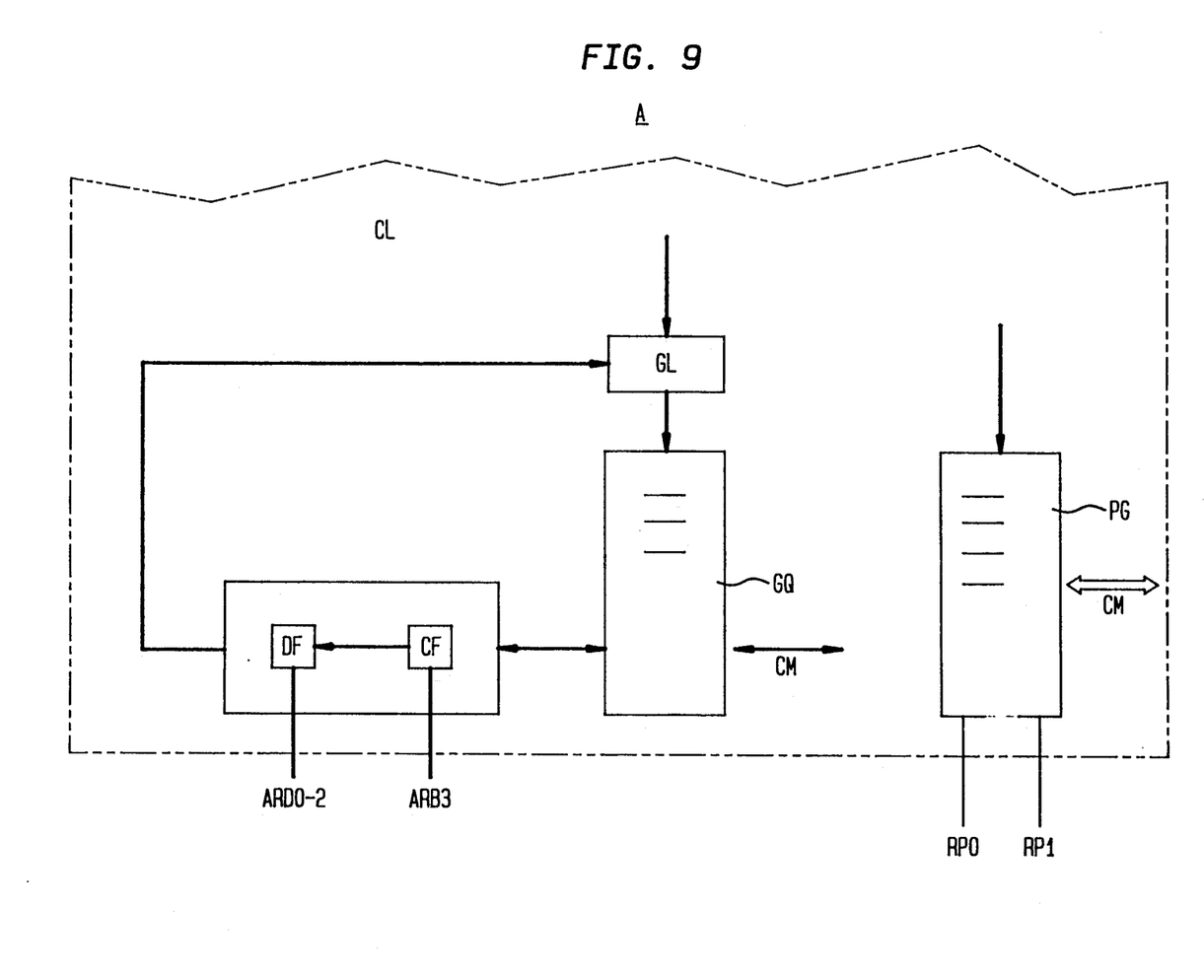

In both single agent and multiple agent embodiments, the Grant Queue GQ shown in FIG. 9 contains eight entries. Arbitration will be suspended whenever there are eight entries in the queue. The state of the ARB-lines will freeze until the queue is popped and there is an open entry. A Time Step will be stretched beyond the normal maximum of three cycles by a full Grant Queue.

FIG. 6 illustrates the interaction of the ARB-lines to define the Time Steps and the Time Slice. The Time Slice is begun when the four agents A, B, C, D that desire to arbitrate, assert the ARB-lines based on their ARBIDs. The two agents, A, B with a COUNT FIELD of 0 assert their associated parallel arbitration lines. Agent A asserts ARB0 and B asserts ARB1. Agents C and D both assert ARB3 to indicate that more Time Steps will be required.

The Time Slice begins in the bus cycle numbered 2 and agent A is assigned to the Grant Queue at the end of that cycle. Cycle 3 shows the Grant Queue increased by 1 to 6 and A no longer asserting ARB0. B continues to assert ARB1 during cycle 3 and is assigned to the Grant Queue at the end of the cycle thus increasing the queue depth to 7 and completing the Time Step. The next Time Step has no agents arbitrating and therefore takes only one clock cycle.

In cycle 5 the final Time Step is begun and therefore ARB3 is no longer asserted. Agent C is assigned to the Grant Queue thus increasing it to its maximum value of 8. This halts arbitration until cycle 8 where an agent gets on the bus and is removed from the Grant Queue. The Time Step and Time Slice are now completed as agent D is assigned to the Grant Queue.

2. Bus Sequencing

Refer now to FIG. 7. The section on arbitration defines the process for ordering agent's access to communicate via request packets over the AP-Bus. Bus Sequencing defines how Request and Reply packets are interspersed on the AP Bus.

Bus sequencing determines the use of the next bus cycle. This determination is based on the state of the reply deferral, RPY, DEF ARB and SPEC lines sampled at the end of the cycle just completed as well as the present state of the Grant and Pipeline Queues. The term "next available bus cycle" used in the following rules refers to the cycle following the packet presently being transmitted on the bus. If there is not a packet on the bus then the cycle in which the state is being examined is considered the next available cycle.

The following rules govern Bus Sequencing

1. If there is an agent identified in the Grant Queue and the Pipeline Queue is not full (less than three transactions), then a Request must take the next available bus cycle.

2. If the Pipeline Queue is full (three transactions in progress) then a Reply may take the next available bus cycle.

3. If the Grant Queue is empty, but the Pipeline Queue is not empty, then a Reply may take the next available bus cycle.

The first rule provides the normal ordering when the Pipeline Queue is not full. Giving Requests precedence over Replies allows the pipeline to be kept as full as possible. Keeping the pipeline full maximizes the use of the available bus bandwidth by having as many transactions in progress as possible. This also maximizes the use of available resources since there can be more than one memory controller (MCU or BXU) attached to the bus. If there are transactions to more than one memory controller, then they will be overlapped.

The second rule declares that once the pipeline is full, then only Replies can be placed on the bus. A Reply reduces the Pipeline Queue depth which would then place the first rule into effect again. If the Grant Queue is not empty, then a Request would go next.

The third rule allows the Pipeline Queue to be emptied when there are no outstanding Requests in the Grant Queue.

It is important to notice that the next reply is not forced onto the bus at any time. Just because the RPY DEF signal lines are not asserted, does not mean that the reply is ready. RPY DEF is only used when the agent knows that its reply will be much slower than the normally expected access time. Thus, the bus sequencing rules define time windows when a reply can go, but it does not force a certain access time on the replying agent.

3. AP-Reply Ordering

The preferred embodiments of the bus can have up to three agents in the pipeline waiting to transmit Replies. Each of these agents occupies a slot in the Pipeline Queue PQ. Each Request on the bus indicates the agent required to Reply and the Replying Agent is identified in a slot in the Pipeline Queue. Slot 1 is the top of the queue and will be occupied by the agent that has been in the queue the longest. Slot 2 contains the second longest while slot 3 contains the most recent agent to be placed in the queue. The ordering of Replies to these transactions is controlled by the Request sequence (as indicated in the Pipeline Queue PQ); however, the Reply deferral mechanism can under certain circumstances indicated in the rules following, alter the normal sequence of Replies.

The following rules govern Reply Ordering:

1. Replies will normally be returned in the order in which the Requests were made. The next Reply would, therefore, be to the transaction in slot 1 of the Pipeline Queue.

2. The replying agent assigned to slot 1 may defer its own slot in the Pipeline Queue until later. This permits a transaction in slot 2 of the Pipeline Queue to be completed before the one ahead of it.

The Replies will normally be returned in the same order that the Requests were placed in the Pipeline Queue.

Thus, the next Reply on the bus will be for the agent identified in slot 1. The Reply for slot 1 will complete that transaction and remove it from the queue. Then all indicated in the Pipeline Queue will move up one slot. The agent in slot 2 will move to slot 1 and the agent in slot 3 to slot 2. The Reply to the new slot 1 will be the next reply normally placed on the bus.

The Reply ordering is modified by the Reply Deferral (RPY DEF0 and RPY DEF1) signals on the Reply Deferral control line. An agent replying to a Request may defer its slot in the Pipeline Queue by asserting one of the RPY DEF signals. A RPYDEF line may only be asserted by the replying agent that owns the reply in slot 1. If a RPYDEF line is asserted, the reply currently associated with slot 1 will be placed at the back of the pipeline queue.

Reply deferral also inhibits the timeout function for the request being deferred. When an agent requires an extended time to make its Reply, it must assert its RPYDEF line to stop the timeout. If the BUS SWITCHING enable control bit is set in the BXU's and MCU's, then RPYDEF only stops the timeout and does not cause reordering of the replies.

G. Bus Details

As can be seen from FIG. 1, and in more detail in FIGS. 8 and 9, the individual agents A, B (VLSI-chips in the preferred embodiment) are connected via associated BXU's or MCU's to the AP Bus. Each BXU and MCU has integrated bus control logic BCL connecting these units to the lines of the bus. The bus control logic BLC with its control part CL and its intermediate register system CM for address and data serves to interface a high speed local processor bus to the very high speed AP Bus.

As shown in FIG. 8, the lines ARB0-3 are used for arbitration, the lines RPY DEF for reply ordering between the agents and additionally lines SPEC0-5 for sequencing. The Arbid-Register AR with its parts CF (count field) and DF (drive field) specifies numbers for time priority (count field) and priority (drive field) between agents which arbitrate in the same time step (FIGS. 7 and 8) and is connected to the lines ARB 0-3. If the priority has been decided according to the arbitration logic, a gate logic GL puts the winning agent into the register Grant Queue GQ. The order of the Grant Queue is stored by definite signals in each agent. The same holds for the register Pipeline Queue PG which determines the reply order according to the logic indicated in FIG. 8.

It will now be understood that there has been disclosed an Advanced Processor Bus System for a VLSI data processor which has a high effective data bandwidth because of the 32 parallel address-and-data lines and the associated parallel specification and control lines, many of which are multiplexed to perform different functions in different times. In addition to the apparatus that provides a high effective data bandwidth, also disclosed are pipelining and arbitration procedures and packet protocols that provide for a high utilization of the effective bandwidth. Moreover, the disclosed AP Bus system apparatus and procedures are flexible and expandable to multi-AP Bus systems and to multi-processor AP Bus systems to suit the system needs because of the modularity of the apparatus and the procedures that make up the AP Bus system. As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. In a data processor in which information is transferred between a plurality of agents attached to a bus by issuing request packets that request data from one of said agents on the bus and reply packets that return data requested by a request packet, a method of mixing request and reply packets on said bus by determining the use of a next-bus cycle using a state of arbitration lines from said agents on said bus, a state of a reply deferral line, and a state of a grant queue and a pipeline queue, said method including the steps of:
   (a) placing representations corresponding to requests for access to said bus in said grant queue in an order determined by the state of said arbitration lines;
   (b) maintaining a pipeline queue of bus transactions where a first bus transaction of a highest priority corresponding to one agent is assigned a highest priority slot in said pipeline queue and a second bus transaction of a next highest priority corresponding to another agent is assigned a next lower priority slot in said pipeline queue, to thereby order said bus transactions in said pipeline queue in a priority sequence;
   (c) forcing a request packet to take a next available bus cycle upon the condition that there is an agent identified in said grant queue and said pipeline queue is not full;
   (d) forcing a reply packet to take a next available bus cycle upon the condition that said pipeline queue is full;
   (e) forcing a reply packet to take a next available bus cycle upon the condition that said grant queue is empty and said pipeline queue is not empty;
   (f) returning said reply packets in said priority sequence that said bus transactions are ordered in said pipeline queue upon the condition that said reply deferral line is not asserted; and,
   (g) reordering said priority sequence of bus transactions in said pipeline queue upon the condition that said reply deferral line is asserted by said one agent on said bus corresponding to said highest priority slot in said pipeline queue to thereby permit said another agent corresponding to a bus transaction in a next lower priority slot of said pipeline queue to gain access to said bus.

2. The method in accordance with claim 1 comprising the further steps of:
   (h) preventing assertion of said reply deferral line by any agent but an agent on said bus corresponding to said highest priority slot in said pipeline queue.

3. The method in accordance with claim 1 wherein each of said plurality of agents has assigned thereto a bus-switching enable control bit, comprising the further steps of:
   (h) initiating a timeout period;
   (i) removing bus transactions from said pipeline queue at the end of said timeout period;
   (j) inhibiting the removal of bus transactions from said pipeline queue at the end of said timeout period upon the condition that said reply deferral line is asserted by said one agent on said bus corresponding to said highest priority slot in said pipeline queue and that the bus-switching enable control bit corresponding to said one agent is set; and,
   (k) preventing the reordering of said bus transactions in said pipeline queue upon the condition that said reply deferral line is asserted by said one agent on said bus corresponding to said highest priority slot in said pipeline queue and that the bus-switching enable control bit corresponding to said one agent is set.

4. The method in accordance with claim 3 comprising the further step of:

(l) preventing assertion of said reply deferral line by any agent except an agent that is assigned said highest priority slot in said pipeline queue at the time said reply deferral line is asserted.

* * * * *